United States Patent
Tsay

(10) Patent No.: US 10,381,810 B1
(45) Date of Patent: Aug. 13, 2019

(54) NETWORK CABLE COMBING TOOL

(71) Applicant: YOUHUNG INTERNATIONAL VIEW CO., LTD., New Taipei (TW)

(72) Inventor: Tzu-Rung Tsay, New Taipei (TW)

(73) Assignee: Youhung International View Co., Ltd., New Taipei (TW)

( * ) Notice: Subject to any disclaimer, the term of this patent is extended or adjusted under 35 U.S.C. 154(b) by 0 days.

(21) Appl. No.: 16/229,587

(22) Filed: Dec. 21, 2018

(51) Int. Cl.
   *H02G 1/14* (2006.01)
   *H01B 13/00* (2006.01)

(52) U.S. Cl.
   CPC ............ *H02G 1/14* (2013.01); *H01B 13/0036* (2013.01)

(58) Field of Classification Search
   CPC ........ H02B 1/14; H01B 13/0036; F16L 3/223; F16L 3/06; F16L 3/222; F16L 3/22; F16L 3/02; A01B 76/00
   USPC ...................................... 248/49, 68.1, 51, 56
   See application file for complete search history.

(56) References Cited

U.S. PATENT DOCUMENTS

| | | | | |
|---|---|---|---|---|
| 3,092,360 A * | 6/1963 | Cook | ......................... | F16L 5/00 174/153 G |
| 3,123,879 A * | 3/1964 | Boduroff et al. | ........ | E04C 5/122 174/84 S |
| 4,163,372 A * | 8/1979 | Frye | ......................... | F16L 3/223 174/175 |
| 4,366,939 A * | 1/1983 | McMillan | ................ | F16L 3/223 248/49 |
| 5,027,478 A * | 7/1991 | Suhr | ....................... | B65H 75/36 137/355.16 |
| 6,375,017 B1 * | 4/2002 | Schattner | ............. | A61M 5/1418 211/70 |
| 6,426,462 B1 * | 7/2002 | Mignon | ................ | G02B 6/4451 138/150 |
| 6,976,512 B2 * | 12/2005 | Loeffler | .................... | B21C 47/34 140/123 |
| 7,600,721 B2 * | 10/2009 | Vermeer | .................... | H02G 1/14 140/123 |
| 9,022,327 B2 * | 5/2015 | Wallingford | .......... | H05K 7/1491 248/49 |

(Continued)

FOREIGN PATENT DOCUMENTS

| DE | 2736730 A1 * | 2/1979 | .............. F16L 3/223 |
|---|---|---|---|
| EP | 2348239 A1 * | 7/2011 | .............. F16L 3/222 |
| JP | 53086959 A * | 7/1978 | |

*Primary Examiner* — Kimberly T Wood
(74) *Attorney, Agent, or Firm* — Rosenberg, Klein & Lee

(57) ABSTRACT

A network cable combing tool includes a columnar main body with either one or both of the ends thereof extended to form a conical tapered end and a grip portion connecting circumferences of both ends of the main body for easy holding. A plurality of clip slots are radially arranged and axially penetrating through the main body; each clip slot has at least three passage holes with an opening formed at an outer end of each passage hole. Thereby network cables are individually embedded into one of the clip slots via its opening and display a neat and organized arrangement. The tapered end at either or both ends of the main body also keeps the embedded cables toward the axis of the main body for further management by cable ties; when performing cable combing with the tool, the resistance is also reduced due to the tapered end. And the integrated design of the grip portion and the clip slots enables a convenient and effortless operation of the network cable combing tool.

3 Claims, 13 Drawing Sheets

(56) References Cited

U.S. PATENT DOCUMENTS

| | | | | |
|---|---|---|---|---|
| 2001/0028823 A1* | 10/2001 | Takeda | ............... | F16B 7/0433 |
| | | | | 403/374.2 |
| 2006/0237597 A1* | 10/2006 | D'Andria | ............ | A61M 5/1418 |
| | | | | 248/68.1 |
| 2010/0010475 A1* | 1/2010 | Teirstein | ............... | A61M 25/02 |
| | | | | 604/528 |

* cited by examiner

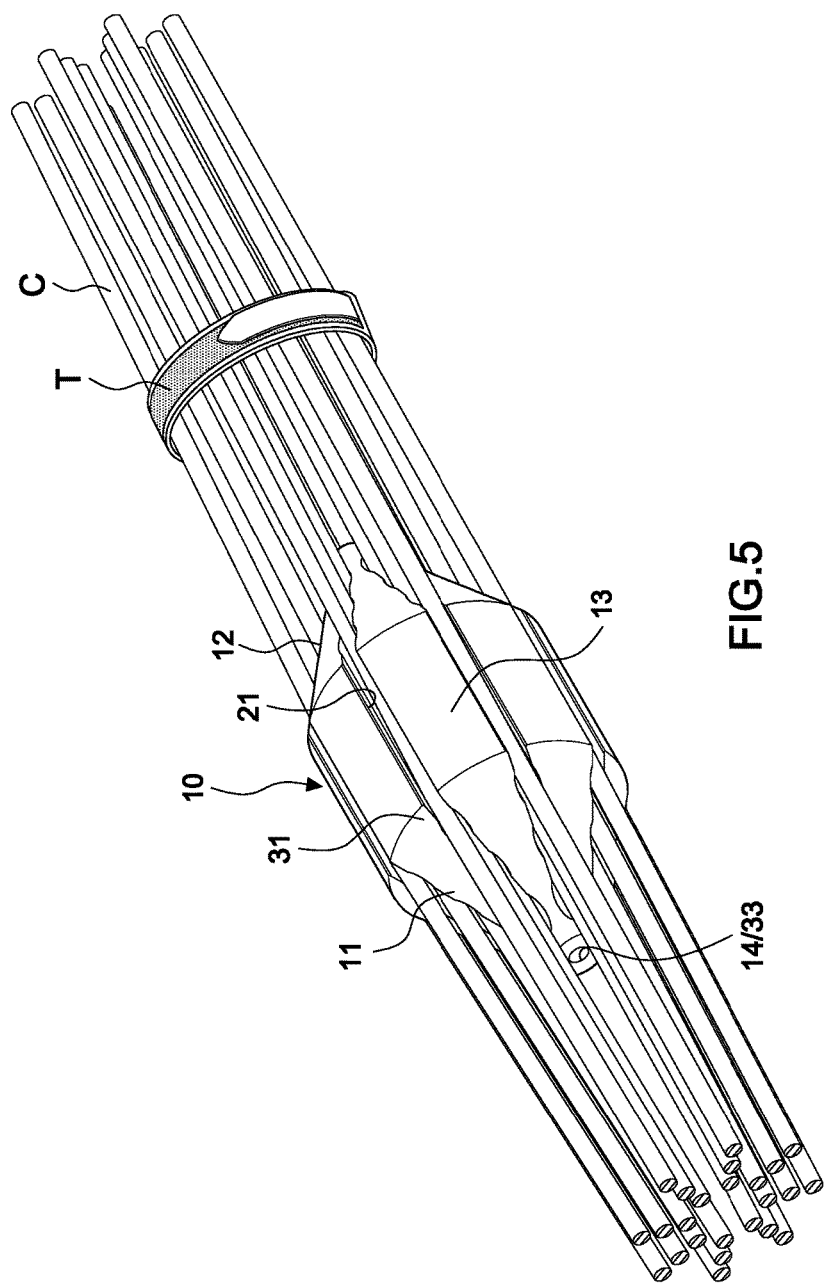

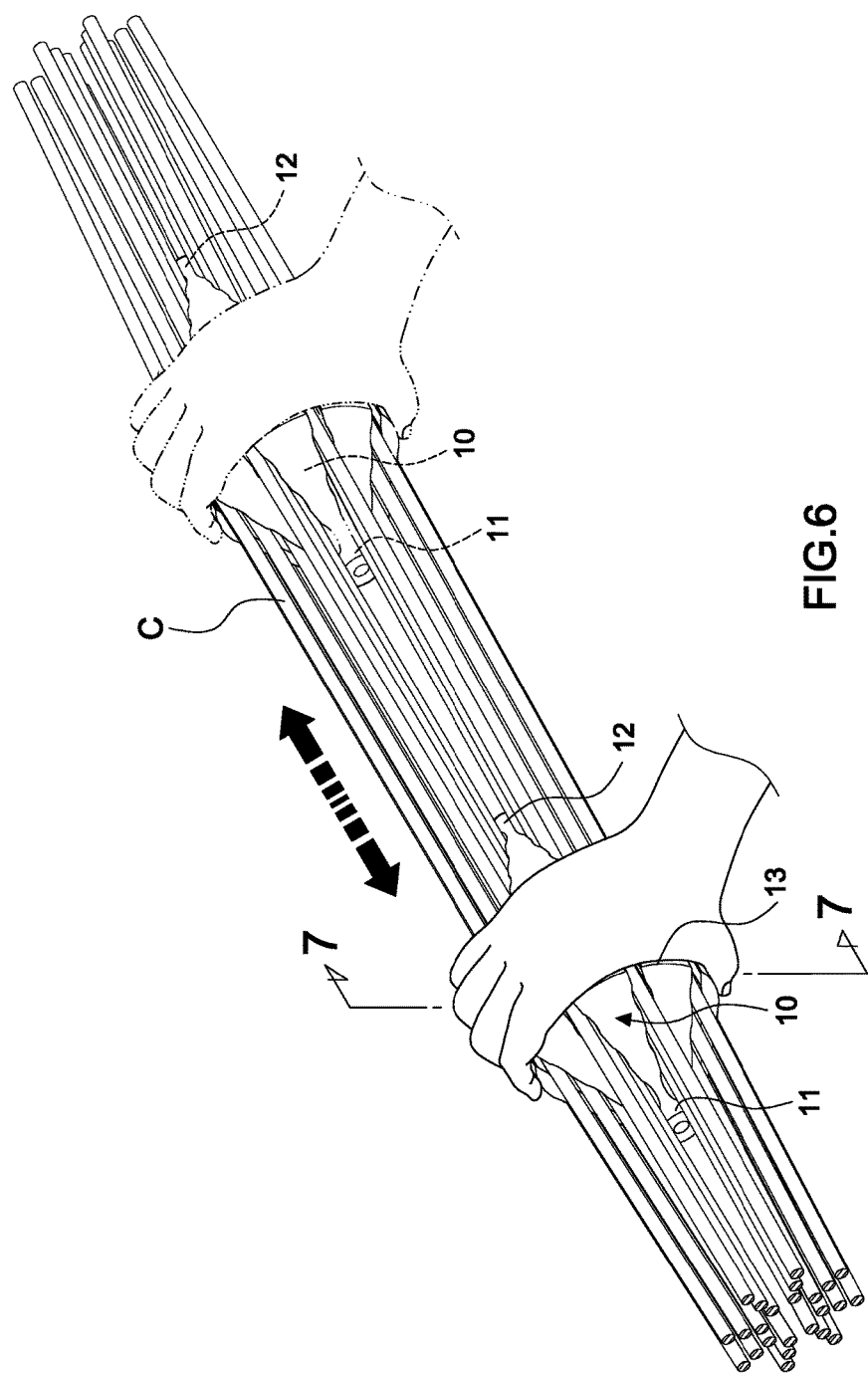

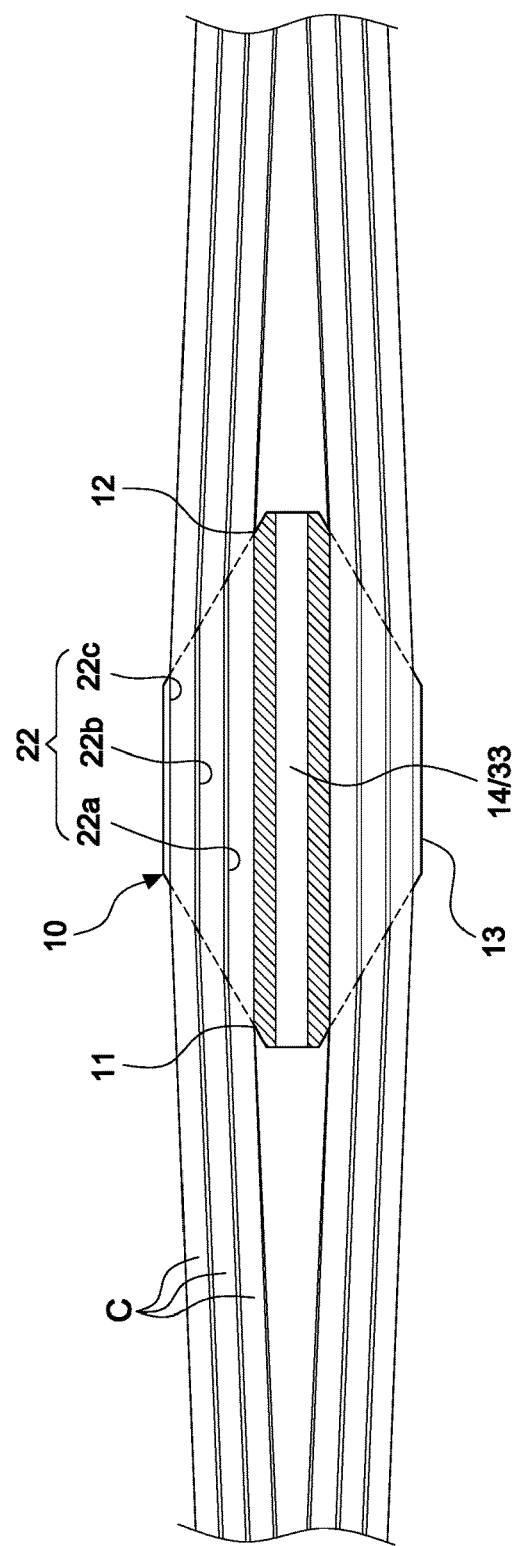

NETWORK CABLE COMBING TOOL

This patent application is a continuation-in-part of Ser. No. 15/710,992 filed on Sep. 21, 2017, currently pending.

BACKGROUND OF THE INVENTION

1. Field of the Invention

The present invention relates to a network cable combing tool, particularly to one that has a plurality of clip slots radially distributed within a main body thereof, thereby it allows management of network cables neatly and performing cable combing easily.

2. Description of the Related Art

At present, most business units, companies or governmental departments rely on computers to handle their business affairs, and most manufacturing machines and equipment are connected to a controller through the computers for automatic operations. Therefore, in the machine rooms many network cables are connected to one or more computer hosts or servers. Since the cables are often placed randomly, it is difficult to find a specific line, and the staggered lines can be anywhere or even occupy a walkway nearby. Consequently, the space in such machine rooms cannot be utilized effectively.

In view of the drawbacks mentioned above, various types of network cable management devices have been developed. FIGS. 1A and 1B illustrated a porous network hub disclosed in Taiwan Patent No. M407552. The porous network hub includes a clip 910 which is substantially in an octagonal columnar shape, and has a plurality of through holes 920 configured to be parallel to the axis of the clip 910 and provided for passing a plurality of cables C respectively to fix each cable C into its position and protecting and preventing the cables from being worn out or damaged. However, a plug or a connector (not shown) at an end of the cable C must be removed first before the cable to be passed through the through hole 920, and then the plug or connector is reinstalled after the cables have been inserted through the through hole 920 of the porous network hub. Obviously, such application is very inconvenient.

FIGS. 2A and 2B illustrated a network cable bundling tool disclosed in U.S. Pat. Nos. 7,959,113 and 7,600,721. The network cable bundling tool includes an inner fitting 930 having a plurality of horizontal pockets 931 axially extended from the inner fitting 930, a first outer jacket half 941 and a second outer jacket half 942 that can be combined by snapping and covered onto the external periphery of the inner fitting 930. When in use, many cables C are embedded into the pockets 931 respectively, and then the second outer jacket half 942 is snapped to fix each cable C to its position, so that the cables C can be arranged neatly without tangling with one another. In an application of such network cable bundling tool, it is not necessary to remove the plug or connector but simply embed any part of each cable into the respective pocket 931. However, both left and right sides of the horizontal pocket 931 are not completely symmetrical with respect to each other; consequently the resistance on the left and right sides are not even and the inner fitting 930 is in an irregular spine-like shape and cannot be held by hand easily. Therefore, it is necessary to combine the first and second outer jacket halves 941, 942 into a housing provided for a user to hold by hand. However, such network cable bundling tool requires the users to install and re-install the first and second outer jacket halves 941, 942 in order to put the cable C into the pocket 931 or remove the cable C from the pocket 931, which is very inconvenient. One the other hand, since the inner fitting 930 has a large end surface, a larger resistance is produced while moving the cables C, and the combing operation of the cables C cannot be done easily either.

FIGS. 2C and 2D illustrated a seal device for an aperture to receive elongate articles disclosed in U.S. Pat. No. 6,353,186. The seal device includes two support members 82a, 82b interconnected by a connecting rod 84 and a sealant block 83. A plurality of channels 88a are formed on the periphery of the support members 82a, 82b for network cables 89 to be disposed therein. Then the cables 89 and the seal device are further secured by a plurality of tie wraps 810 for fixation. Such device is simply a cable tying device and does not include the function of cable combing for further management, nor was there mentioned the device being moved along the cables or the resistance produced when it was being moved.

FIGS. 2E and 2F illustrated a wedge anchor disclosed in U.S. Pat. No. 3,123,879. The wedge anchor has a plurality of locking wedges 714 engaging a locking surface 720 of a cylindrical metal body of an anchor 710 as a flange of the anchor 710 aligning with a flat surface 730 at an end of each locking wedge 714. Each locking wedge 714 further includes a flat surface 726 near a center of the locking wedges 714, two semi-cylindrical channels 728 each of which arranged at a side surface 724 thereof and a longitudinal channel 729 extended along a corresponding convex outer surface 722 thereof. A plurality of wires 712 are engaging through the channels 728, 729 correspondingly. Each of the channels 728, 729 only allows a string of wires 712 to be disposed therethrough, and after the wires 712 are in position, the locking wedges 714 together with the wires 712 have to be further engaged with the locking surface 720 and fixed in the anchor 710. The anchor 710 is designed to be conical for fixed engagement of the anchor 710 and the locking wedges 714 with the wires 712. Therefore, the wedge anchor is also simply a tying device for wires or cables and does not have the function of combing or managing the wires or cables, considering that the wedge anchor obviously cannot be moved along the wires or cables therein.

In view of the drawbacks of the aforementioned devices and tools, it is a main subject for the manufacturers in the field to provide a convenient network cable management device, so that the users can embed the cables into the device easily and neatly. When the cables are tangled and messy, such device is expected to be used to comb the cables quickly and effortlessly.

SUMMARY OF THE INVENTION

A primary objective of the present invention to provide a network cable combing tool that has network cables embedded therein for neat arrangement and management of network cables which are collected by cable ties. The tool also has clip slots integrated with a grip portion for its users to comb the embedded network cables easily and conveniently.

Another objective of the invention is to provide a network cable combing tool that has a lightweight and requires low prime cost.

To achieve the objectives mentioned above, the present invention comprises a columnar main body having a first end and a second end corresponding to said first end, at least one of said first end and second end extended to form a conical first tapered end; a grip portion connecting a circumference of said first end and a circumference of said second end of the main body with a predetermined length provided for holding by a user; and a plurality of clip slots radially arranged around a center of said main body as said center being an axis, said clip slots penetrating through said main body radially and each of said clip slots having an inner end arranged as a closed end, an outer end extended to a peripheral surface of said grip portion to form an opening and at least three passage holes between said inner and outer ends; said at least three passage holes defined as a first passage hole arranged at said inner end of a corresponding clip slot, a third passage hole arranged at an outer end of said corresponding clip slot and a second passage hole arranged between said first and third passage holes of said corresponding clip slot.

Wherein each clip slot is resilient and formed by a first side wall and a second side wall, said first and second side walls arranged parallel and opposite from each other in a predetermined distance, and the at least three passage holes in each clip slot are formed by a first arc surface arranged on the first side wall and a second arc surface arranged on the second side wall with a predetermined diameter, the first passages holes arranged to form a circumference of a first concentric circle near the axis of the main body, the third passage holes arranged to form a circumference of a third concentric circle far from the axis of the main body, and the second passage holes arranged to form a circumference of a second concentric circle between the first and third concentric circles; whereby a network cable is embedded into one of the passage holes in accordance with a diameter thereof, as the diameter of the network cable shorter than the predetermined diameter of the passage holes and longer than the distance between the first and second side walls, thereby network cables can be collected in the passage holes neatly without staggering and kept toward the axis of the main body by the first tapered end.

In addition, a conical second tapered end is formed by extension at an opposite end of the first tapered end to reduce resistance when the main body is moved along the embedded network cables for repeatedly combing, and a fixing portion is formed in-between two clip slots of the main body, said fixing portion designed as a hollow member, and the axis of the main body is arranged as a hollow axis for the purpose of reducing the weight and prime cost of the present invention.

With structure disclosed above, the network cable combing tool achieves the following advantages:

1. The clip slots are radially arranged within the main body around the central axis thereof and penetrating through the main body axially. Therefore, the network cables can be embedded in the cable combing tool without removal of the plug or connector at either end of the cables. And the cable combing tool can be placed along the cables randomly without any restriction.

2. The present invention has either one or both of the ends thereof manufactured into a conical tapered end, allowing the embedded network cables to be kept towards the axis of the main body and thereby saving spaces left between the embedded cables. The cables can be further collected by one or more cable ties for convenient and neat management.

3. The grip portion around the main body is designed for easy holding of its users. Moreover, with either one or both of the ends of the main body extended from the grip portion to form a conical tapered end, the resistance produced when moving the cable combing tool along the embedded network cables is reduced, making it easier for the users to arrange and manage the network cables. In other words, the design of integrating the grip portion and the main body achieves a more convenient and effortless operation for its users.

4. The design of the fixing portions made into hollow members and the axis of the main body made a hollow axis also reduces the weight and the prime cost of the network cable combing tool.

BRIEF DESCRIPTION OF THE DRAWINGS

FIG. 5 is a practical application view of the present invention according to the second embodiment;

FIG. 6 is a schematic diagram showing the present invention used for network cable combing according to the second embodiment;

FIG. 8 is a sectional view taken along line 8-8 of FIG. 7.

DETAILED DESCRIPTION OF THE PREFERRED EMBODIMENT

Figure 1A:
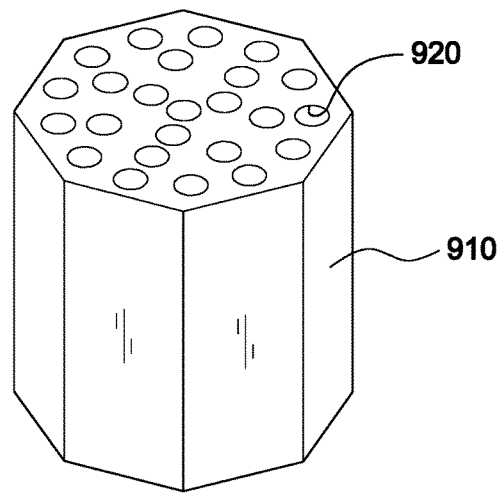
FIG. 1A is a perspective view of a conventional network cable hub.
Figure 1B:
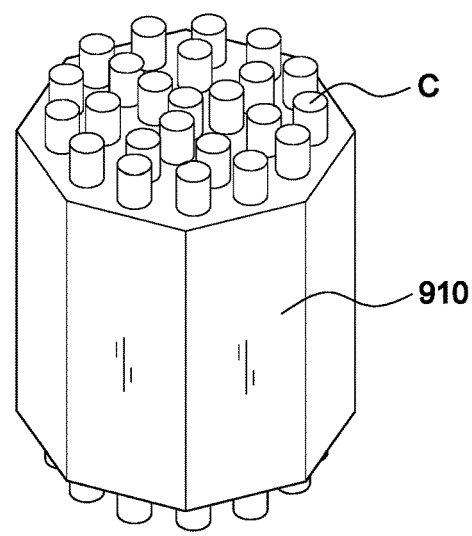
FIG. 1B is a schematic view of an application example of a conventional network cable hub.
Figure 2A:
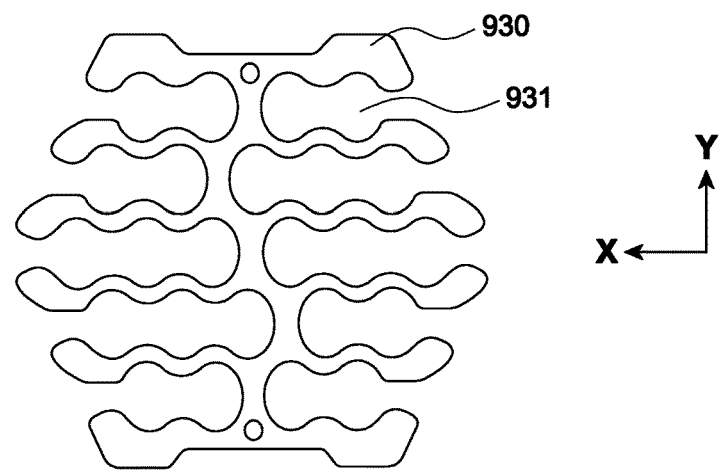
FIG. 2A is a schematic view of structure of a cable tying device disclosed in U.S. Pat. No. 7,959,113.
Figure 2B:
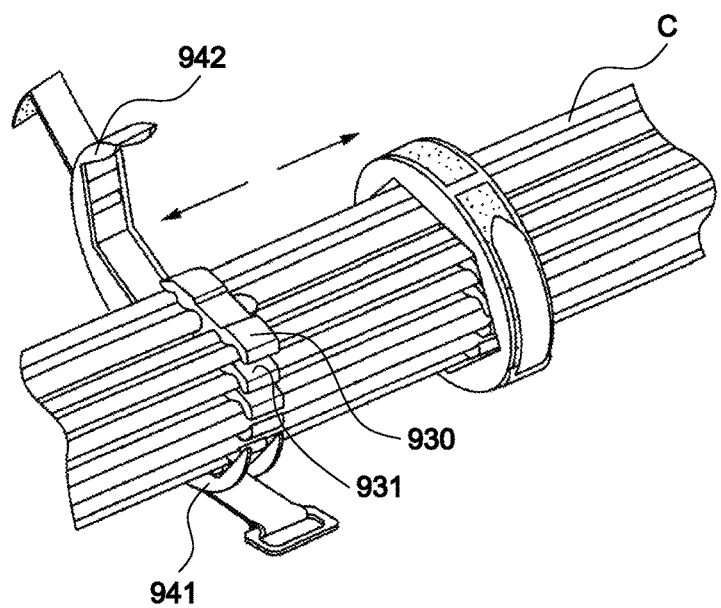
FIG. 2B is a schematic view of an application example of the cable tying device disclosed in U.S. Pat. No. 7,959,113.
Figure 2C:
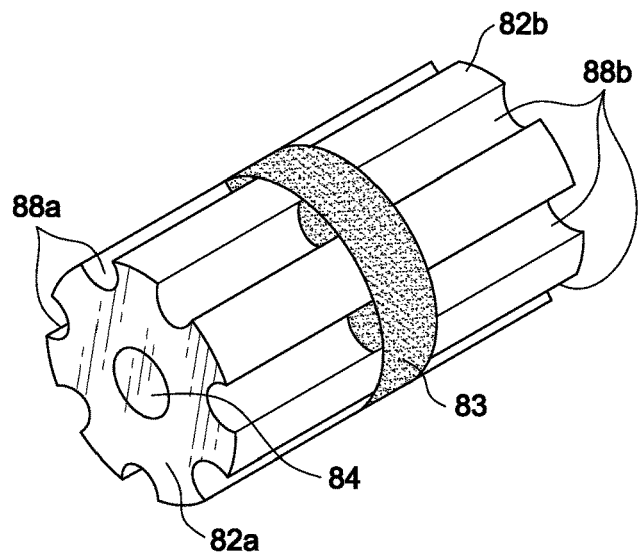
FIG. 2C is a perspective view of a component of a seal device disclosed in U.S. Pat. No. 6,353,186.
Figure 2D:
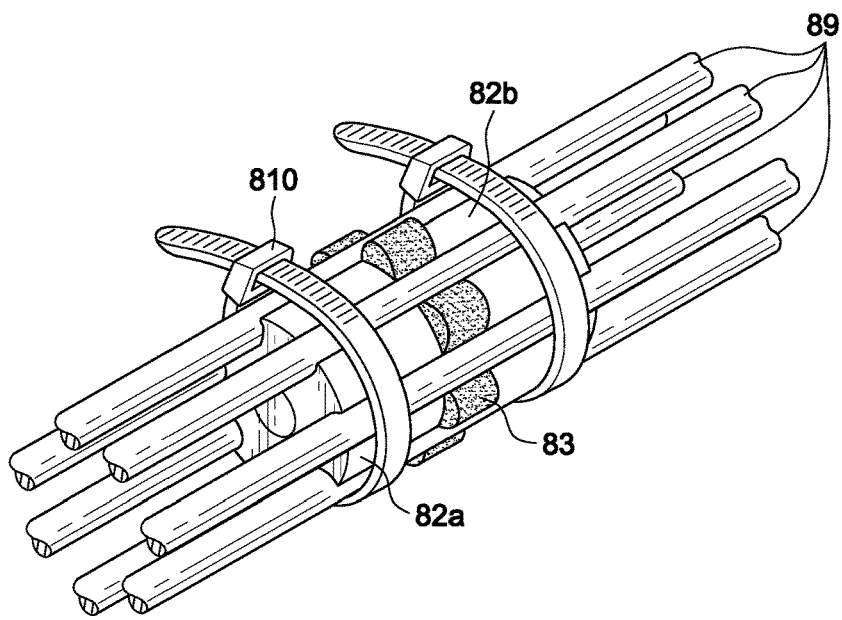
FIG. 2D is a perspective view of an application example of the seal device disclosed in U.S. Pat. No. 6,353,186.
Figure 2E:
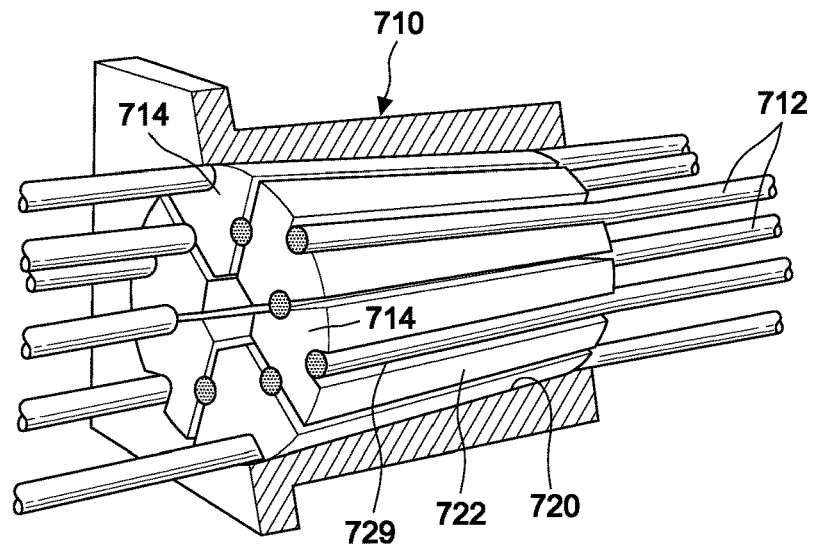
FIG. 2E is a partially sectional view of an anchor disclosed in U.S. Pat. No. 3,123,879.
Figure 2F:
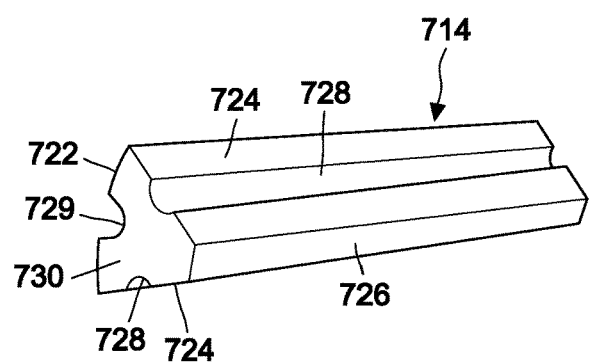
FIG. 2F is a perspective view of an anchoring wedge of the anchor disclosed in U.S. Pat. No. 3,123,879.

FIGS. 3A-3G illustrated the present invention in a first embodiment. In the embodiment, the present invention mainly includes a main body 10, a grip portion 13 and a plurality of clip slots 21.

The main body 10 has a first end 101 and a second end 102 corresponding to the first end 101; at least one of the first end 101 and second end 102 is extended to form a conical first tapered end 11. In this embodiment, the first tapered end 11 is formed at the first end 101 of the main body 10.

The grip portion 13 is connecting a circumference of the first end 101 and a circumference of the second end 102 of the main body 10 with a predetermined length L provided for holding by a user.

Figure 3A:
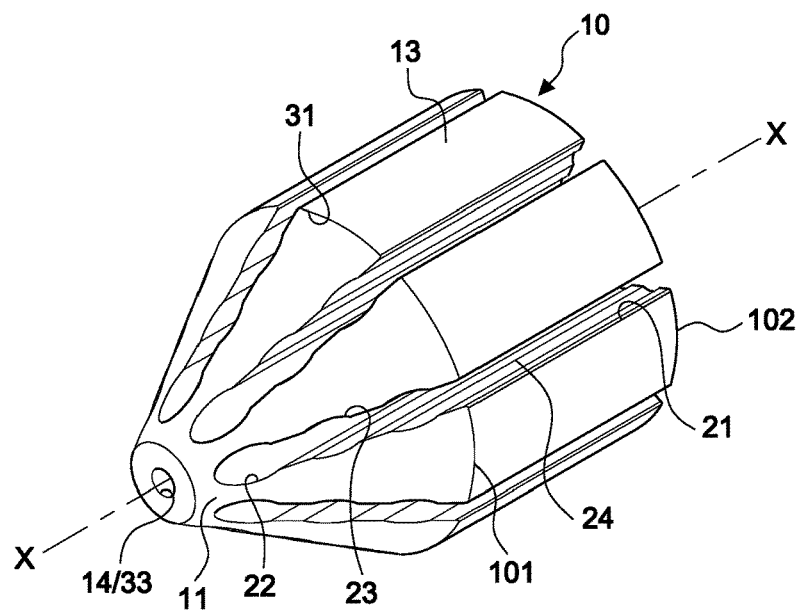
FIG. 3A is a perspective view of the present invention in a first embodiment.
Figure 3B:
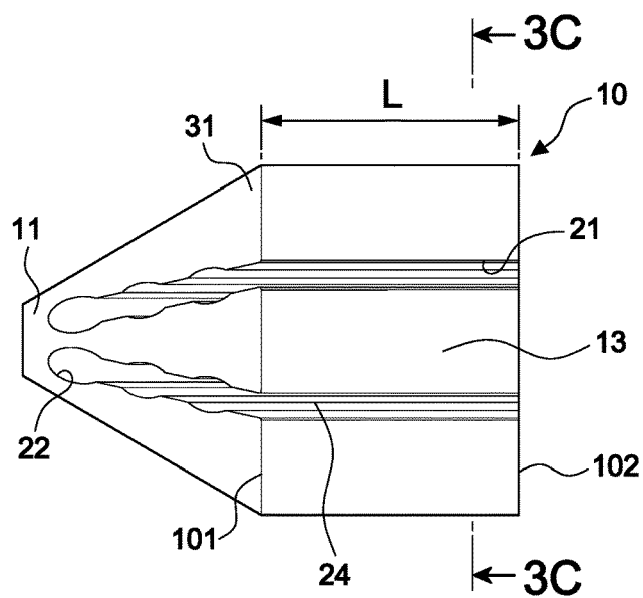
FIG. 3B is a front elevation view of the present invention in the first embodiment.
Figure 3C:
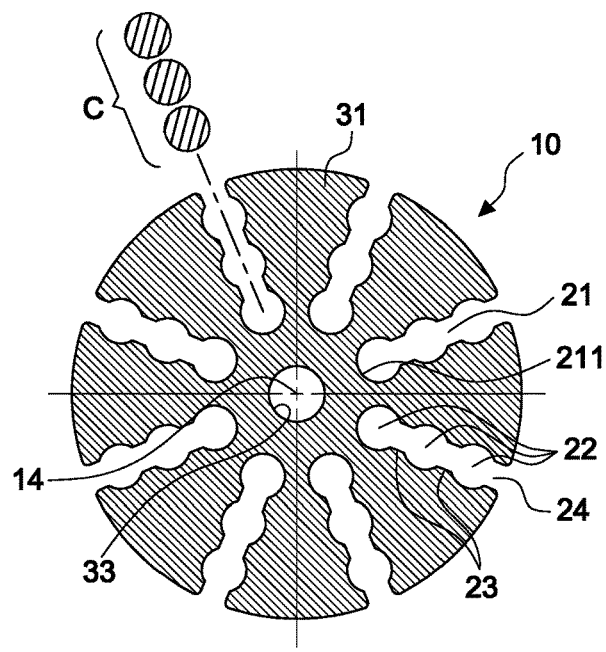
FIG. 3C is a sectional view taken along line 3C-3C of FIG. 3B.
Figure 3D:
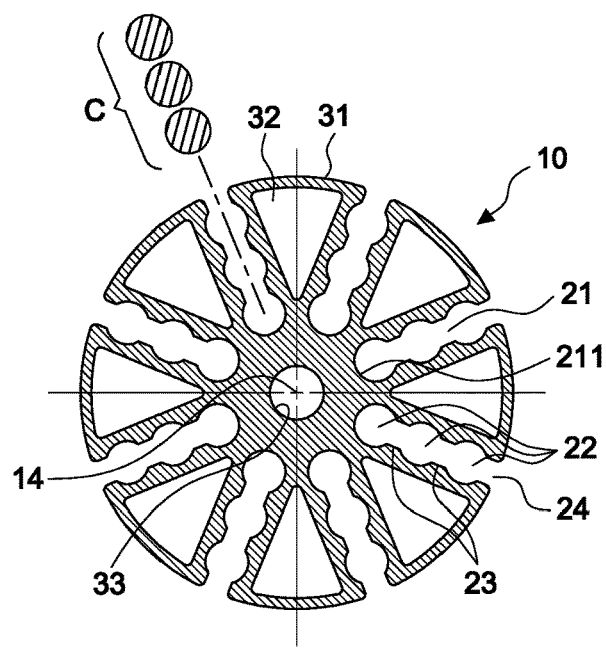
FIG. 3D is a sectional view of FIG. 3C in another applicable embodiment according to the present invention.

Further referring to FIG. 3C, the plurality of clip slots 21 are radially arranged around a center of the main body 10 as the center being an axis 14. The clip slots are penetrating through the main body 10 radially along an X direction and each of the clip slots has an inner end arranged as a closed end 211, an outer end extended to a peripheral surface of the grip portion 13 to form an opening 24. The major difference from the tools disclosed in the prior art lies in that the radially arranged clip slots 21 are distributed symmetrically with respect to the axis 14 so that network cables embedded in the main body 10 are evenly disposed and can be easily managed, and that the clip slots 21 and the grip portion 13 are integrated into the main body 10 without the need of any outer jackets. In this embodiment, the clip slots 21 has at least three passage holes 22 formed between the closed end 211 and opening 24 by a first side wall 212 and a second side wall 213 which are arranged with an uneven surface 23. Furthermore, a fixing portion 31 is formed in-between two clip slots 21 and can be designed as a concrete member or a hollow member 32 (shown in FIG. 3D), and the axis 14 of the main body 10 is arranged as a hollow axis 33 so as to reduce the weight and prime cost of the main body 10.

Figure 3E:
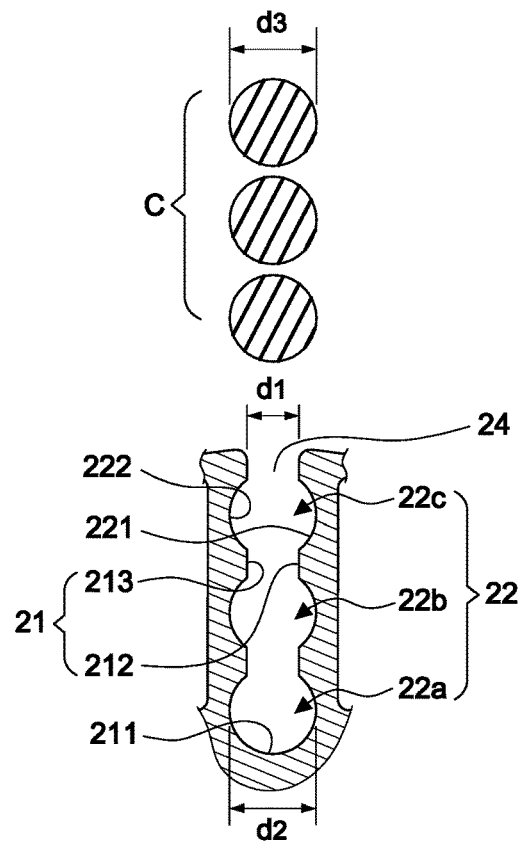
FIG. 3E is an enlarged schematic diagram of partial structure of FIG. 3D.
Figure 3F:
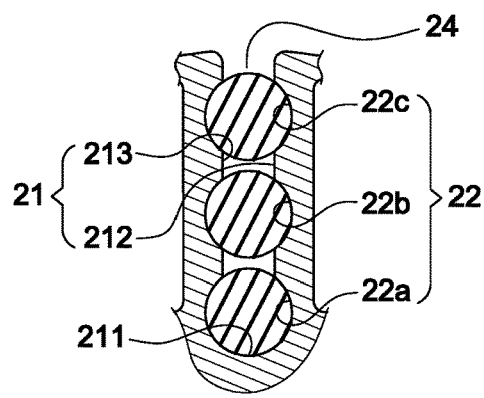
FIG. 3F is a schematic diagram of the structure of FIG. 3E assembled.
Figure 3G:
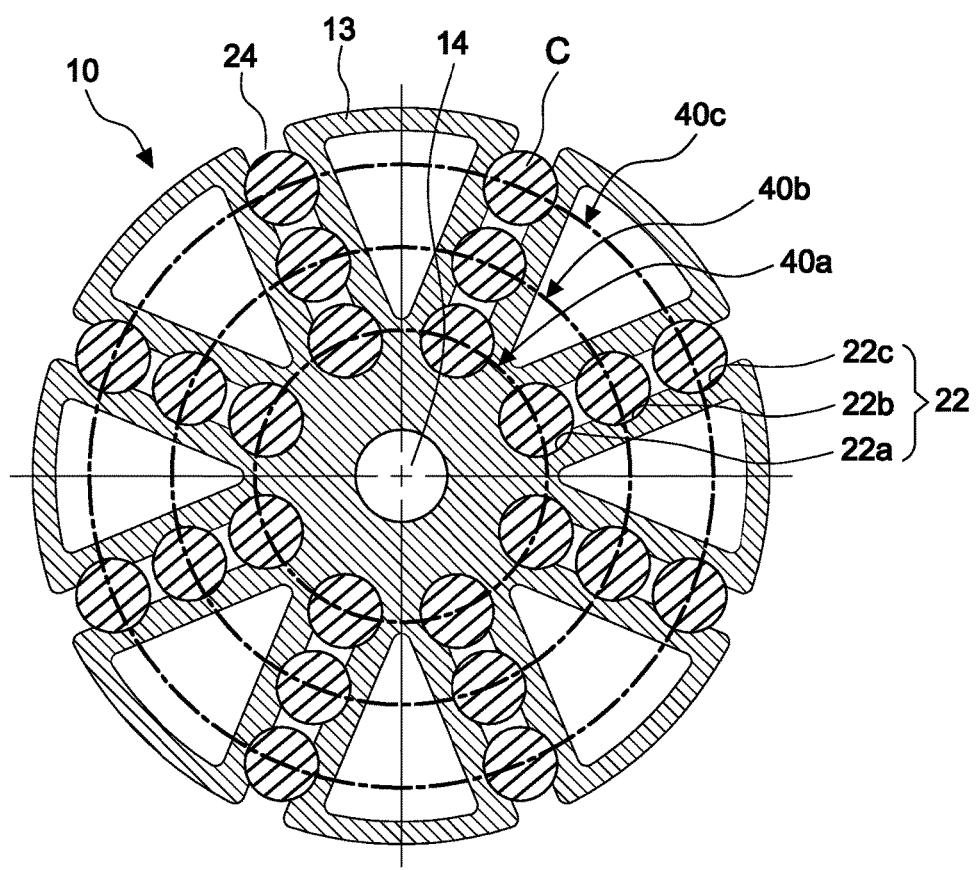
FIG. 3G is a schematic diagram of concentric circles formed by passages holes according to the present invention.

Further referring to FIGS. 3E-3G, the at least three passage hole 22 within each clip slot 21 are defined as a first passage hole 22a arranged at the inner end thereof, a third passage hole 22c arranged at an outer end thereof and a second passage hole 22b arranged between the first and third passage holes 22a, 22b thereof. The clip slot 21 are resilient and each of which is formed by the side wall 212 and the second side wall 213; the first and second side walls 212, 213 are arranged parallel and opposite from each other in a predetermined distance d1, and the three passage holes 22 in each clip slot 21 are formed by a first arc surface 221 arranged on the first side wall 212 and a second arc surface 222 arranged on the second side wall 213 with a predetermined diameter d2. In addition, the first passages holes 22a of the clip slots 21 are arranged to form a circumference of a first concentric circle 40a near the axis 14 of the main body 10; The third passage holes 22c of the clip slots 21 are arranged to form a circumference of a third concentric circle 40c far from the axis 14 of the main body 10; And the second passage holes 22b of the clip slots 21 are arranged to form a circumference of a second concentric circle 40b between the first and third concentric circles 40a, 40c. Thereby a network cable C is embedded into one of the passage holes 22 in accordance with a diameter d3 thereof; the diameter d3 of the network cable C should be shorter than the predetermined diameter d2 of the passage holes 22 and longer than the distance d1 between the first and second side walls 212, 213, so that the network cables C can be collected in the passage holes 22 neatly without staggering and are kept toward the axis 14 of the main body 10 by the first tapered end 11.

Figure 4A:
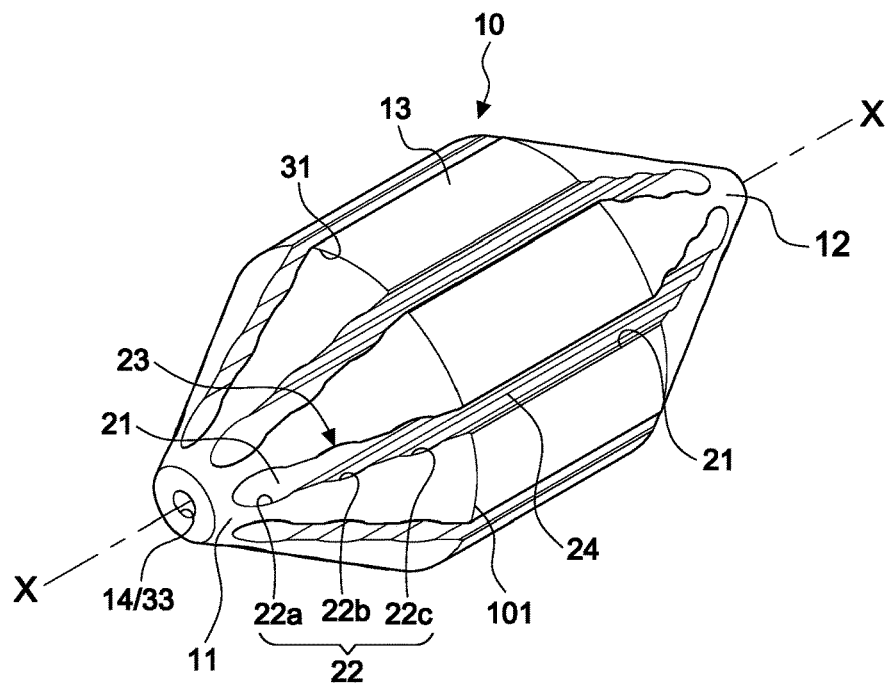
FIG. 4A is a perspective view of the present invention in a second embodiment.
Figure 4B:
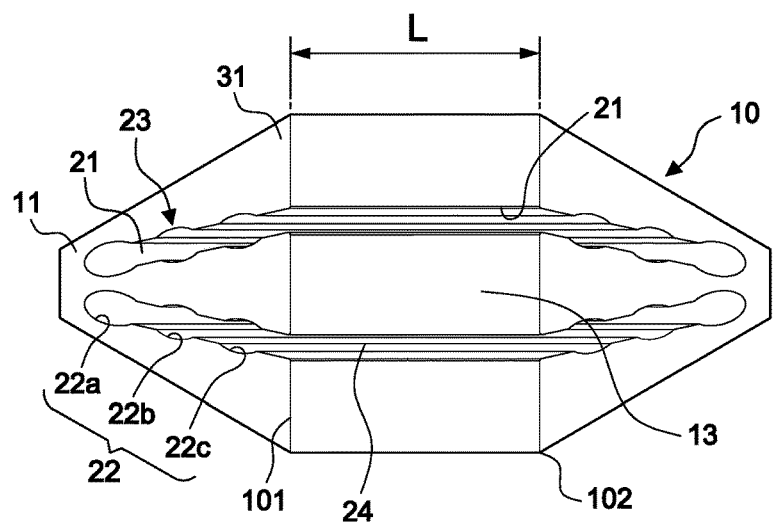
FIG. 4B is a front elevation view of the present invention in the second embodiment.

FIGS. 4A and 4B illustrated a second embodiment of the present invention. Apart from the same structures and components as in the first embodiment, a conical second tapered end 12 is formed by extension at an opposite end of the first tapered end 11 to reduce the resistance when the main body 10 is moved along the embedded network cables C for repeatedly combing.

Further referring to FIG. 5, in an application example of the second embodiment, a user may have the network cables C embedded into the passage hole 22 from the openings 24 of the clip slot 21. In this embodiment, each clip slot 21 has three passage holes 22 and therefore is able to receive three network cables C. With each clip slot 21 penetrating through the main body 10 axially in the X direction, the passage holes 22 in the clip slots 21 are also configured correspondingly, so that the network cables C embedded into the passage holes 22 will not be tangled. Also, with both ends extended to form the conical first tapered end 11 and the second tapered end 12, the passage holes 22 in the clip slots 21 are parallel and tapered toward the axis 14, thereby keeping the network cables C in the clip slots 21 towards the axis 14 as well and saving the space left between the network cables C. Then a user can further apply one or more cable ties T to easily keep the network cables C neatly arranged.

FIG. 6 illustrated the present invention combing the network cables C according to the second embodiment. Since the network cables C in application are often moved and thereby tangled, the present invention can be applied to rearrange the cables C by firstly removing the cable ties T originally fastened around the cables C, and then moving the main body 10 of the present invention by the grip portion 13 along the network cables C; the network cables C passing through the first and the second tapered ends 11, 12 would be rearranged neatly and the tangle of the network cables C can be straightened for the cable ties T to be fastened around again.

With the plurality of clip slots 21 radially arranged around the axis 14 of the main body 10 and the penetrating through both ends of the main body 10, the network cables C are distributed evenly and can be embedded into the clip slots 21 without removal of either end of the cables C. The design of tapered ends 11, 12 also keeps the cables C toward the axis 14 of the main body 10 and saves the space left between the cables C for the cable ties T to be conveniently fastened. The grip portion 13 designed around the outer periphery of the main body 10 allows its users to move it along the cables C without spending much efforts as the resistance is reduced the tapered ends 11, 12; additionally, the grip portion 13 is integrated with the clip slots 21 and therefore there is no need for any outer jackets for the present invention, also saving the prime cost as well.

With the structures disclosed above, the present invention is not just a cable fixing tool, it is able to literally further comb the network cables C when in need, and the features of the present invention are described as following, especially different from the seal device disclosed in U.S. Pat. No. 6,353,186 and the wedge anchor disclosed in U.S. Pat. No. 3,123,879.

With reference to FIGS. 3E and 3F, the predetermined diameter d2 of the passage holes 22 is longer than the diameter d3 of the network cables C, and both the diameters d2, d3 are longer than the distance d1 between the first and second side walls 212, 213. Therefore, when a string of network cables C is embedded into one of the clip slots 21 via a corresponding opening 24, the network cable C can be embedded therein smoothly due to the resiliency of the clip slots 21. And with the arrangement of the first, second and third passage holes 22a, 22b, 22c, the embedded network cables C would display a neat and even arrangement around the main body 10 of the present invention and would not be loosened from the clip slots 21 of the present invention without further help from other components such as tie wraps or securing anchors.

Figure 7:
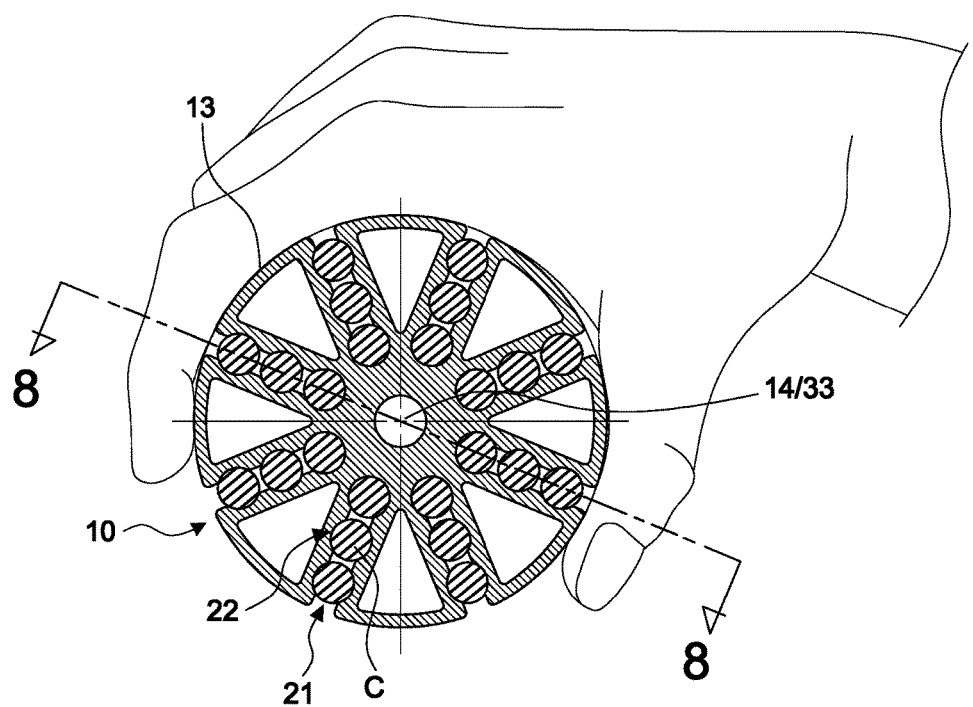
FIG. 7 is a sectional view taken along line 7-7 of FIG. 6.

More importantly, as shown in FIG. 3G, the first passage holes 22a are arranged to form the first concentric circle 40a around the axis 14 of the main body 10; the third passage holes 22c are arranged to form the third concentric circle 40c; and the second passage holes 22b are arranged to form the second concentric circle 40b. The clip slots 21 enables the network cables C to be distributed evenly and neatly as shown in FIGS. 6 and 7. Moreover, the present invention would encounter less resistance when being moving along the network cables C with the help of the tapered ends 11, 12 for easily combing and rearranging the cables C.

Although particular embodiments of the invention have been described in detail for purposes of illustration, various modifications and enhancements may be made without departing from the spirit and scope of the invention. Accordingly, the invention is not to be limited except by the appended claims.

What is claimed is:

1. A network cable combing tool, comprising:
a columnar main body having a first end and a second end corresponding to said first end, at least one of said first end and second end extended to form a conical first tapered end;
a grip portion connecting a circumference of said first end and a circumference of said second end of the main body with a predetermined length provided for holding by a user; and
a plurality of clip slots radially arranged around a center of said main body as said center being an axis, said clip slots penetrating through said main body radially and each of said clip slots having an inner end arranged as a closed end, an outer end extended to a peripheral surface of said grip portion to form an opening and at least three passage holes between said inner and outer ends; said at least three passage holes defined as a first passage hole arranged at said inner end of a corresponding clip slot, a third passage hole arranged at an outer end of said corresponding clip slot and a second passage hole arranged between said first and third passage holes of said corresponding clip slot;
wherein each clip slot is resilient and formed by a first side wall and a second side wall, said first and second side walls arranged parallel and opposite from each other in a predetermined distance, and the at least three passage holes in each clip slot are formed by a first arc surface arranged on the first side wall and a second arc surface arranged on the second side wall with a predetermined diameter, the first passages holes arranged to form a circumference of a first concentric circle near the axis of the main body, the third passage holes arranged to form a circumference of a third concentric circle far from the axis of the main body, and the second passage holes arranged to form a circumference of a second concentric circle between the first and third concentric circles;
whereby a network cable is embedded into one of the passage holes in accordance with a diameter thereof, as the diameter of the network cable shorter than the predetermined diameter of the passage holes and longer than the distance between the first and second side walls, thereby network cables can be collected in the passage holes neatly without staggering and kept toward the axis of the main body by the first tapered end.

2. The network cable combing tool as claimed in claim 1, wherein a conical second tapered end is formed by extension at an opposite end of the first tapered end to reduce resistance when the main body is moved along the embedded network cables for repeatedly combing.

3. The network cable combing tool as claimed in claim 1, wherein a fixing portion is formed in-between two clip slots of the main body, said fixing portion designed as a hollow member, and the axis of the main body is arranged as a hollow axis.

* * * * *